United States Patent [19]

Rhodes

[11] 4,402,582
[45] Sep. 6, 1983

[54] PARASITIC DRIVEN HELIOSTAT MIRROR DECLINATOR

[75] Inventor: William A. Rhodes, Phoenix, Ariz.

[73] Assignee: James F. Duffy, Phoenix, Ariz.

[21] Appl. No.: 343,598

[22] Filed: Jan. 28, 1982

[51] Int. Cl.³ .......................................... G03D 21/00
[52] U.S. Cl. ...................................... 353/3; 126/424; 350/289; 350/568
[58] Field of Search .................... 353/3, 121; 126/424, 126/425; 350/289, 568; 250/203 R; 74/63, 42; 33/365, 401; 136/246

[56] References Cited

U.S. PATENT DOCUMENTS

| | | | |
|---|---|---|---|
| 1,169,076 | 1/1916 | Greve | 74/42 |
| 1,185,611 | 5/1916 | Dougan | 74/61 |
| 1,451,387 | 4/1923 | Burns | 33/401 X |
| 2,045,191 | 6/1936 | Kreidler | 33/401 X |
| 2,646,720 | 7/1953 | Poliansky | 353/3 |
| 3,656,844 | 4/1972 | Botskor | 353/3 |
| 4,149,777 | 4/1979 | Bunch | 353/3 X |

Primary Examiner—Stephen Marcus
Assistant Examiner—William R. Sharp
Attorney, Agent, or Firm—Don J. Flickinger

[57] ABSTRACT

An automatic parasitically driven declinator for changing the tilt angle of the mirror of a heliostat to provide solar declination tracking by the heliostat. The declinator includes an axial gear drive train coupled to the polar axial shaft of the heliostat, which shaft is rotated. A pendulum arrangement coupled via an input shaft to the axial gear drive train is substantially held in plumb position by gravity wherein the gear drive train is driven as it is rotated about the polar axis by the polar axial shaft. An output shaft coupled to the gear train is rotated to drive a skew bar linkage assembly that is connected to the mirror mounting assembly of the heliostat. The gear ratio of the gear drive train assembly is made 365:1 so that the mirror angle is annually nutated a predetermined number of degrees corresponding to the cyclic variations of solar declination.

18 Claims, 6 Drawing Figures

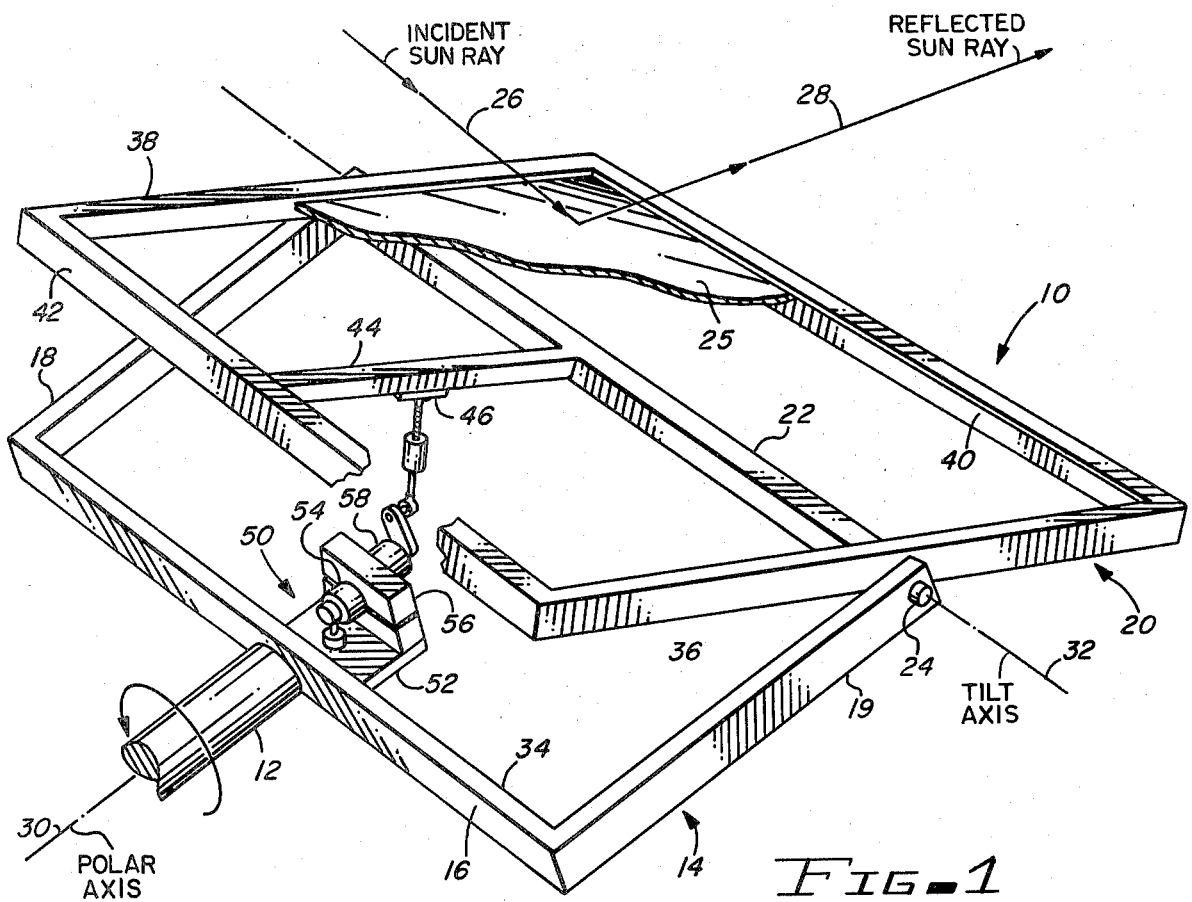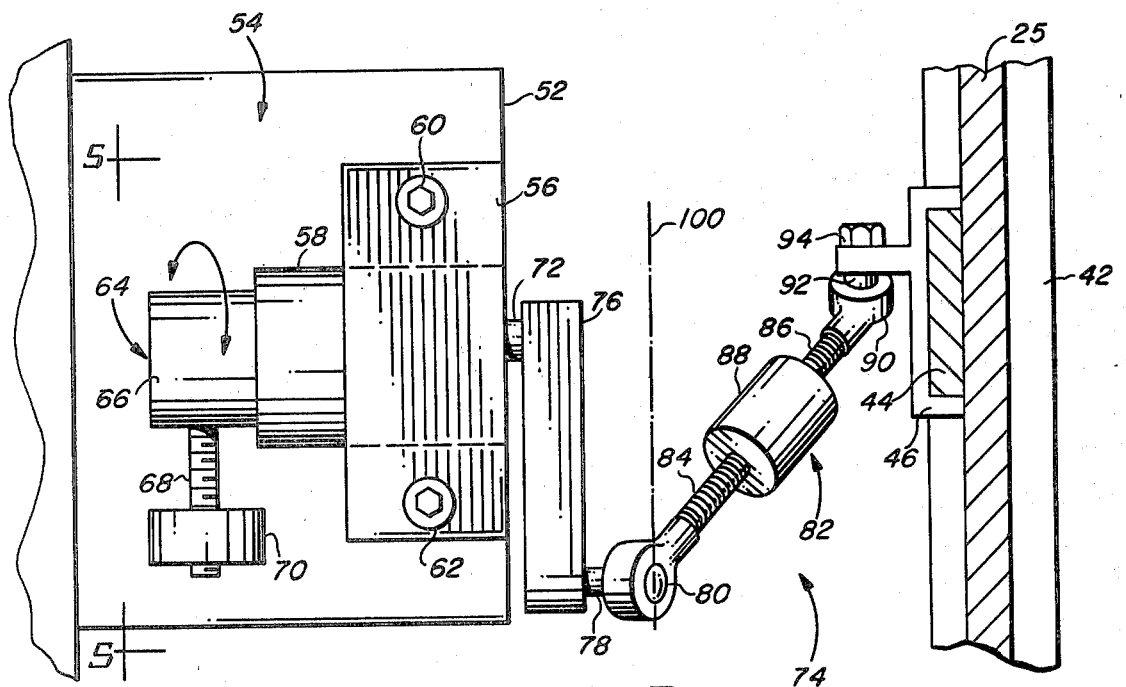

PARASITIC DRIVEN HELIOSTAT MIRROR DECLINATOR

BACKGROUND OF THE INVENTION

1. Field of the Invention

The present invention relates to an axial gear drive train and method for driving the gear drive train. More particularly, the invention relates to a gear drive train and method for actuating the gear drive train particularly adapted for use with a heliostat to correct the daily position thereof such that the heliostat follows seasonal solar declination changes.

2. Description of the Prior Art

A heliostat is a device known in the prior art. A heliostat, through the use of an automated reflector, tracks the passage of the sun in a manner so as to provide a stationary reflected beam output from the tracking reflector. As with all celestial tracking equipment, the heliostat must be oriented in azimuth and in elevation. The azimuth line of orientation is a true north-south meridian. The elevation angle is the polar angle defining the local elevation angle between Earth and the celestial pole. Once established, azimuthal axis and the polar axis remain as fixed references for the heliostat device. The position of the sun, however, is a variable which must be tracked with reasonable accuracy if a stationary reflected beam output of the heliostat is to result.

The operation of the heliostat must take into account both the twenty-four hour cyclic nature of the apparent movement of the sun across the Earth's sky as the Earth rotates as well as solar declination. Thus, to track the sun's daily rotation, the heliostat must be rotated about its polar axis one revolution per twenty-four hour day. Driving mechanisms are available for rotating the heliostat about its axis so as to track the sun as the Earth rotates. One such driving mechanism is described in my co-pending application, Ser. No. 205,769, filed Nov. 10, 1980, entitled Step Motor Drive System for Heliostat.

Solar declination is the angular deviation from perpendicularity of the sun's rays with respect to the polar axis. If the sun's rays strike the polar axis at an angle of ninety (90) degrees, the solar declination is said to be zero degrees. This is the situation at the Spring Equinox.

As the sun moves in the Ecliptic, it moves higher in the sky. Its rays, intersecting the polar axis, appear to be leaning toward the northern pole until at Summer Solstice, the solar declination is said to be about 23.5° north. Having achieved its height at the peak of summer, following the Ecliptic, the sun descends in the sky until it crosses the celestial equator once again thereby achieving zero degree solar declination: Autumnal Equinox.

The elevation angle of the sun in the sky continues to decrease until it reaches its furthermost declination at the Winter Solstice at which its rays intersect the polar axis again at an angle of 23.5° south. This solar declination is repeated annually as the sun defines the Ecliptic as it moves from south to north and back to south each year.

As aforesaid, the heliostat must take into account both variations of the apparent movement of the sun with respect to the Earth: the twenty-four hour and the annual solar declination cyclic periods. The heliostat, in itself, would appear to be a simple device. A mirror is positioned so that the sun's rays striking its surface are reflected at an angle parallel to the polar axis. A drive mechanism, such as described in my aforementioned co-pending application, is provided to rotate the mirror as the sun apparently travels westwardly across the sky. The mirror must also be tilted about an axis perpendicular to the polar axis to adjust to the solar declination. As is true with the twenty-four hour cyclic period of the sun's movement, the solar rate of declination is not uniform. Thus, ordinary clock work mechanisms are not adequate to provide accurate tracking of the heliostat with the sun's movement.

The basic heliostat, in and of itself, is relatively inexpensive. However, the methods for adjusting movement of the heliostat to accurately track the sun can be cost prohibitive, if not a nuisance, to prevent commercial use of the heliostat. For instance, to track solar declination, both manual and electrical schemes have been used utilizing slip rings feeding a servo-mechanism from an angle computer remotely located.

Thus, a need exists for a simple, inexpensive driving mechanism for tilting the mirror surface of the heliostat to accurately track the solar declination.

Accordingly, it is an object of the present invention to provide a parasitically driven axial gear drive mechanism.

Another object of the present invention is to provide a parasitically driven gear train mechanism for tilting the mirror and mirror assembly of a heliostat wherein the heliostat tracks the solar declination.

Still another object of the present invention is to provide an improved and relatively inexpensive declinator for a heliostat to be utilized in the tracking operation of the heliostat.

SUMMARY OF THE INVENTION

In accordance with the above and other objects, there is provided a parasitically driven axial gear drive mechanism and method for driving the mechanism in response to the rotating of a first shaft member about its longitudinal axis. The parasitically driven mechanism is coupled to the rotatable first shaft mechanism in parallel and substantially aligned therewith such that the axial gear drive mechanism is rotated with the first shaft mechanism. A pendulum member coupled to an input shaft of said gear drive is held substantially plumb by the force of gravity wherein the axial gear drive mechanism is driven as the mechanism is rotated by said rotatable first shaft mechanism. An output shaft geared to the axial gear drive mechanism opposite the pendulum member in a predetermined gear ratio is thus caused to revolve.

In a preferred embodiment, the rotatable first shaft mechanism is connected to a heliostat having a mirror attached to a mirror assembly which is tiltedly attached to the heliostat about the declination axis of the heliostat. The first shaft mechanism forms the polar axis of the heliostat whereby the mirror is made to track the sun in its twenty-four hour cyclic period. The output shaft is coupled to the mirror assembly by means of a skew bar linkage assembly such that as the output shaft revolves, the mirror is declinated to track the solar declination. In this embodiment, the gear ratio between the axial gear drive mechanism and the output shaft is 365:1. Thus, the output shaft completes one complete revolution per 365 revolutions of the first shaft mechanism.

The skew bar linkage assembly includes a crank member attached to the output shaft at one end of which is positioned a drive pin perpendicular thereto. A shaft linkage connects the distal end of the drive pin to the mirror assembly to tilt the mirror about the heliostat declination axis. To provide maximum accuracy and minimum solar declination tracking error, a ratio between the length of the radius defined by the distance from the center of the output shaft to the drive pin, and the spacing between the plane of rotation formed at the distal end of the drive pin as it revolves to the heliostat declination axis was mathematically determined. This ratio is equal to 0.208.

The terminology used above is clearly defined within the following specification.

BRIEF DESCRIPTION OF THE DRAWINGS

FIG. 1 is a perspective assembly view illustrating the significant aspects of a heliostat in which the parasitically driven declinator assembly of the present invention is utilized;

FIG. 2 is an enlarged sectioned view of the axial drive gear train and linkage assembly of the embodiment of the present invention;

DESCRIPTION OF THE PREFERRED EMBODIMENTS

Figure 3:
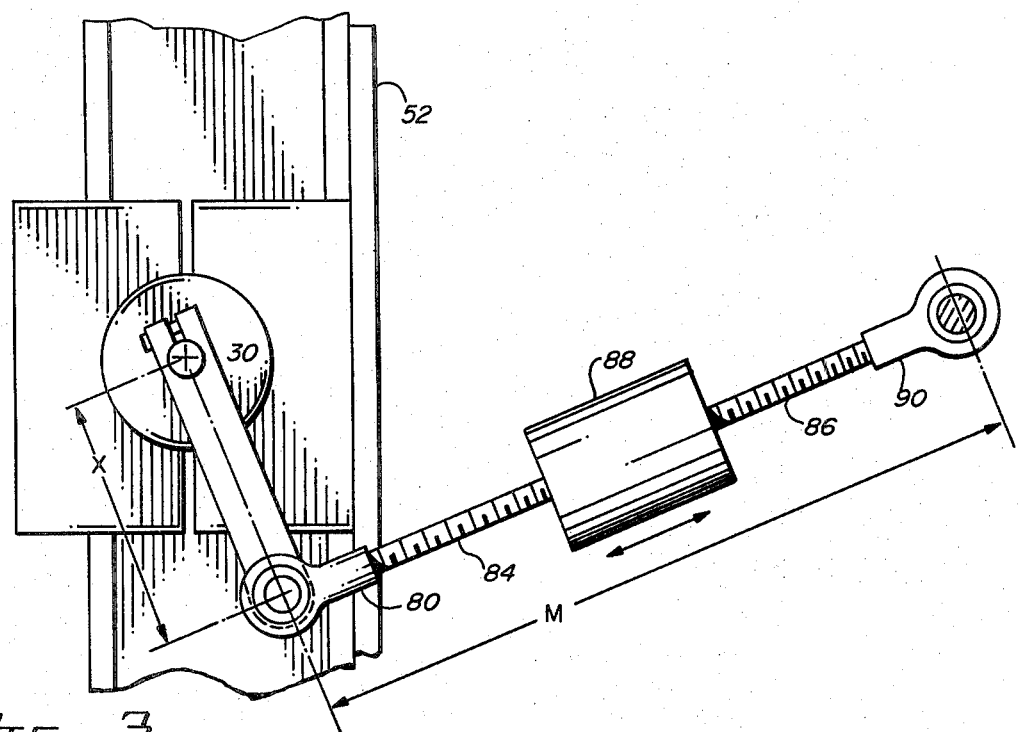
FIG. 3 is an enlarged side view of the embodiment of the present invention.
Figure 4:
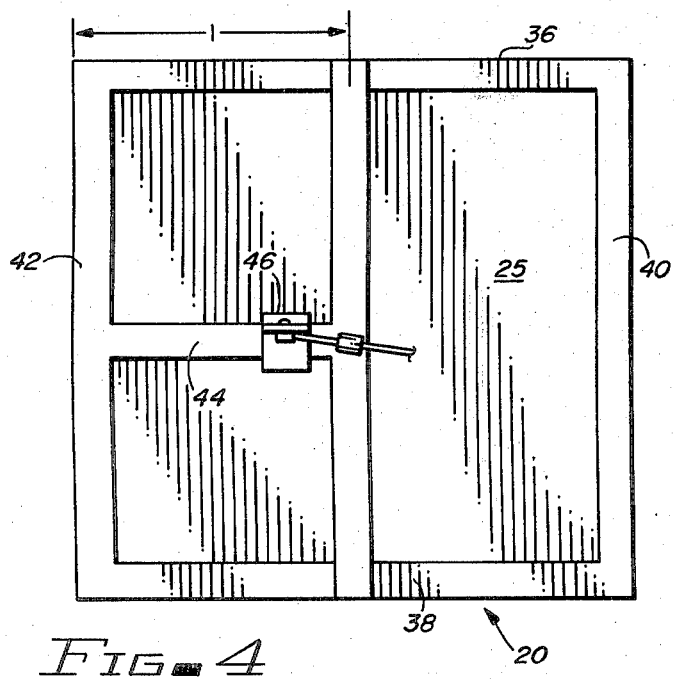
FIG. 4 is a plan view of the underside of the mirror and mirror assembly of the heliostat utilized in conjunction with the present invention.

The present invention relates to an axial gear drive train mechanism that is parasitically driven in response to the rotation of a first member to which the axial gear drive train mechanism is mounted. The use of the term "parasitically" will be further explained later but is used because the invention, as disclosed herein, derives its source of "energy" via a coupling between the force of gravity and the rotation of the first member. Although the invention may be used to drive an output shaft geared therewith to operate a myriad of systems, for clarity the following description of the utilization of the present invention is described in connection with the tracking operation of a heliostat.

In view of the above, a polar axially aligned heliostat 10 is illustrated in FIG. 1. The polar axis of heliostat 10 is taken through the longitudinal axis of first shaft, or mirror shaft member 12. Rotatable shaft 12 is coupled to support member 14 at yoke 16. Yoke 16 is attached to vertical support arms 18 and 19 to which mirror assembly 20 is tiltedly mounted. Mirror assembly 20 is attached to tilting frame member 22 which pivots about pivotal points 24. A mirror surface 25 is attached to mirror assembly 20 to reflect incident rays 26 of the sun as illustrated by reflected ray 28. As previously mentioned, the mirror surface 25 and mirror assembly 20 of heliostat 10 are manipulated so that reflected ray 28 will be parallel to polar axis 30. The general instructions described above are understood by those skilled in the art.

In practice, to maintain reflected ray 28 parallel to polar axis 30, heliostat 10 must be shifted due to the movement of the sun with respect thereto. In practice, some type of clock drive mechanism will be used to rotate shaft 12 about the polar axis 30 in a counterclockwise direction as shown. Rotating shaft 12 is centered so as to rotate about the polar axis 30 which, as shown, extends from the heliostat 10 to the celestial pole and lies in a north-south meridian plane with respect to the Earth's poles. Any synchronous clock drive may be used to rotate shaft 12 so that heliostat 10 tracks the movement of the sun in its apparent travel from East to West across the sky. A mechanism for rotating shaft 12 is disclosed in my co-pending application aforementioned which is incorporated herein by reference made thereto.

Tilting frame member 22 defines an axis 32 through the pivot points 24 about which mirror assembly 20 and the mirror plane tilts. Tilt axis 32 is also defined as the declination axis of heliostat 10. In practice, base 34 of yoke 16 is parallel to the mirror-reflector tilt axis 32 and thus its intersection with the polar axis 30 will be at a right angle.

Mirror assembly 20 is in the form of a rectangle and includes two longitudinal bars 36 and 38 attached at right angles to frame member 22. Longitudinal bars 36 and 38 are held spaced apart by horizontal end bars 40 and 42, respectively. A cross member 44, bisecting end bar 42, is connected between bar 42 and frame member 22. Mirror surface 25 is attached to mirror assembly 20 with the reflecting surface facing outward.

In operation, heliostat 10 is adjusted by rotating shaft 12 to bring declination axis 32 into such position that its intersection with incoming rays of the sun form a right angle. This sets the clock drive mechanism driving shaft 12 to the local solar time. Mirror 25 and mirror assembly 20 are rotated about declination axis 32 and with respect to the polar axis 30 until the reflector surface of the mirror 25 is adjusted so that the sun's incident ray 26 is reflected from the mirror surface 25 parallel to, or along, polar axis 30. As long as shaft 12 is rotated by a drive mechanism synchronized with the variation in solar rotation about the Earth, the reflected ray 28 from the mirror will remain fixed during the day.

However, due to solar declination, the apparent travel of the sun about the Ecliptic, the sun's incident rays 26 move with respect to declination axis 32 each day. This seasonal solar declination, as understood by those skilled in the art, must be followed by appropriate changes in the mirror declination (tilt) to provide a constant polar reflection. As total solar declination is approximately forty-seven degrees, i.e., the sun travels north of its Spring Equinox position to the June Solstice by 23.5 degrees and then southward passing through its Autumnal Equinox to a maximum point of 23.5 degrees at the December Solstice, the total mirror tilt angle must change by 23.5 degrees. Thus, mirror assembly 20 must be driven by an appropriate drive mechanism, or declinator, $\pm 11.75$ degrees above and below declination axis 32 in synchronization with variations in the solar declination. For a more detailed analysis of the non-linear variations in the solar declination, my co-pending application, Ser. No. 113,774, is referred to and incorporated herein by reference made thereto, which was filed on Jan. 20, 1980, and entitled Heliostat-Adjusting Solar Sight. The subject invention is related to an alignment device for providing an accurate and inexpensive scheme for declinating mirror assembly 20 so that heliostat 10 tracks solar declination.

Parasitic declinator assembly 50 is shown in FIG. 1 which is attached to yoke 16 and coupled by suitable linkage, as will be described, to mounting bracket 46. Mounting bracket 46 is attached to cross member 44 at a predetermined distance, as will be explained. The term "parasitic" is derived from the action of declinator assembly 50 driving its source of energy via coupling between gravity and the rotation of heliostat 10 by rotation of shaft 12. As illustrated, a mounting plate 52 is attached to yoke 16. An axial gear drive train assembly 54 is mounted by mounting assembly 56 to mounting plate 52. Mounting assembly 56 is comprised of two pieces that clampingly accept gear box 58 (FIG. 2) of the axial gear drive train assembly 54. The two halves of mounting assembly 56 are bolted together by mounting screws 60 and 62 to mounting plate 52. In this manner, axial gear drive train assembly 54 is rigidly mounted parallel to, and substantially in alignment with, the heliostat polar axis.

Figure 5:
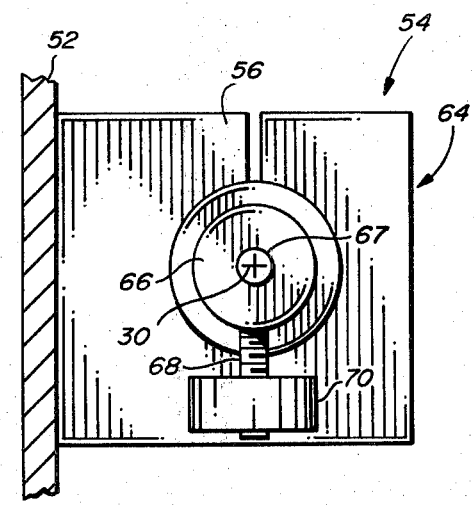
FIG. 5 is an enlarged end view illustrating the pendulum assembly and axial gear drive train assembly of the present invention taken in the direction of arrows 5—5 of FIG. 2.
Figure 6:
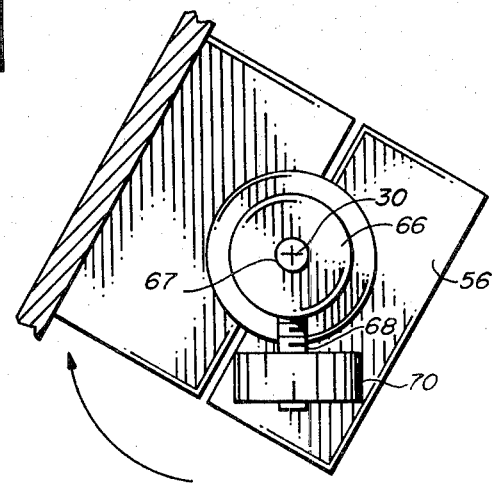
FIG. 6 is an enlarged end view as illustrated in FIG. 5 showing the rotation of the axial gear drive train assembly by the substantially plumb pendulum assembly as the drive train rotates about the polar axis.

An input shaft 67 geared to the gear drive train assembly 54 is coupled to a small rod pendulum assembly 64. Pendulum assembly 64 comprises attachment member 66, which is physically attached to the input shaft 67. A rod 68 attaches weight member 70 to attachment member 66. The weight of pendulum 64 is sufficient to hold it substantially plumb due to the force of gravity, as shaft 12 is rotated. Thus, it is seen in FIGS. 5 and 6 that the input shaft 67 of axial gear drive train assembly 54 is driven by maintaining pendulum assembly 64 substantially plumb as the axial gear drive train assembly 54 rotates about polar axis 30 in response to rotation of shaft 12 by the twenty-four hour tracking mechanism of heliostat 10.

The gear ratio between the input shaft 67, to which pendulum assembly 64 is attached, and output shaft 72 (see FIG. 2) is made 365:1 such that shaft 12 must be rotated 365 times to cause one complete revolution of output shaft 72. In other words, output shaft 72 is rotated 1/365th of a complete revolution every twenty-four hours as axial gear drive train 54 is driven by pendulum 64 remaining essentially plumb at all times while drive train 54 rotates on polar axis 30 each day.

In order to cyclically drive the mirror tilt angle once a year, the output shaft 72 is coupled by a skew bar linkage assembly 74 (FIG. 2) to mounting bracket 46 of mirror assembly 20. The skew bar linkage assembly 74 comprises a crank member 76 which is attached at one end thereof to output shaft 72 and a drive pin 78 that is positioned at the distal end of crank member 76 perpendicularly thereto. The distal end of drive pin 78 is formed to fit into a semi-ball-and-socket assembly 80. A drive rod linkage assembly 82, comprising links 84 and 86 connected by threaded coupler 88, connects the motion of crank member 76 and drive pin 78 to mounting bracket 46 through a second universal fitting 90. Universal fitting 90 is connected to mounting bracket 46 by bolt 92 and nut 94. As shown in FIG. 2, the end, or ball portion of drive pin 78, defines a circle in the plane of rotation 100 as it is rotated by crank member 76 having a radius of length x (see FIG. 3).

As crank member 76 makes one revolution about shaft 72, the drive rod linkage 82 moves in somewhat of a rectilinear motion from a minimum position to a peak position thereby tilting mirror assembly 20 between tilt angles corresponding to the June and December Solstice positions of the sun.

The geometry of the linkage between axial gear drive train assembly 54 and mirror assembly 20 is of particular importance. This is especially true if tracking errors are to be minimized. It is of utmost importance that the mirror 25 and mirror assembly 20 be cyclically tilted about the tilt axis so that the mirror tilt angle is sufficient to cause the mirror to reach the June and December Solstice angles. These two positions do not occur exactly six months apart. One Solstice is reached six days early and the other six days late making for a twelve day total error factor.

The mirror angle requirement at Solstice of ±11.75° from the 45° Equinox angle is a fixed system as governed by the Earth, its orbital tilt vs solar position. From this fact, it was mathematically determined that the ratio between x the radius of the circle described by drive pin 78 in plane 100 and the distance y from the plane of rotation 100 of the distal end of pin 78 to the heliostat declination axis (FIG. 1) should be equal to the constant: 0.208. The length, l, of each symmetrical half of longitudinal bar members 36 and 38 can be arbitrarily chosen. Also of importance is the length, m, of the drive rod linkage 82 and the distance, n, from the reflective plane of the mirror 25 to the attachment point of drive rod 82 to bracket 46.

A heliostat, of the type described herein, has been built incorporating the automatic parasitic mirror declinator mechanism disclosed above having the following significant dimensions:

| Parameter | Dimension |
|---|---|
| x | 1.664 inches |
| y | 8.000 inches |
| l | 8.713 inches |
| m | 6.909 inches |
| n | 1.5 inches |

The heliostat declinator mechanism is adjusted to establish the correct mirror angle position as follows:

(a) Crank 76 is pointed downwards and maintained plumb while skew linkage 82 and bracket 46 are adjusted to assure non-interference of motion as crank 76 describes its annual movement of 360°. This downward plumb position of crank 76 corresponds to the crank's December Solstice position.

(b) With crank 76 in its downward, plumb, Winter Solstice position, adjust threaded coupler 88 to bring the plane of mirror 25 to an angle of 33.25° with respect to the polar axis 30.

(c) Drive the gear assembly 54 to bring crank 76 to an upward pointing, plumb position. This is the Summer Solstice position of crank 76.

(d) Determine the angle at which the plane of mirror 25 now intersects the polar axis. The correct angle is 56.75°.

(e) Adjust skew linkage coupler 88 and the position of bracket 46 so as to decrease any angle error by approximately one-half.

(f) Drive the gear assembly 54 to the Winter Solstice position and determine the angle between the plane of mirror 25 and the polar axis. The desired angle is 33.25°.

(g) Repeat step (e).

(h) Continue the procedure until the mirror travels an arc of 23.5° between the extremes of 33.25° and 56.75° as crank 76 is driven between Winter and Summer Solstice positions.

(i) Drive the gear assembly 54 to establish the mirror plane at the proper angle for the date on which the system is aligned.

(j) Minimize the tracking error of the heliostat by repeating step (i) on one of the following dates: February 3, May 3, August 9, or November 6.

In practice, the heliostat constructed in accordance with the aforedescribed parasitic mirror declinator mechanism and adjusted as above, tracked the solar declination with a maximum non-accumulative error of 0.89°. Such minimal "maximum tracking errors" are achieved by alignment on any one of the following dates: February 3, May 3, August 9, or November 6. Maximum gross error attributable to alignment at intervening dates is 1.79°.

Thus, what has been disclosed above is a novel automatic, parasitic heliostat mirror declinator for changing the tilt angle of the mirror to track variations in the solar declination throughout the yearly period. The declinator derives its source of energy via coupling between gravity and the rotation of the heliostat mirror by a clock driving mechanism.

Various changes and modifications to the embodiment herein chosen for purposes of illustration will readily occur to those skilled in the art. To the extent that such modification and variations do not depart from the spirit of the invention, they are intended to be included within the scope thereof which is assessed only by a fair interpretation of the following claims.

Having fully described and disclosed the present invention in such clear and concise terms as to enable those skilled in the art to understand and practice the same, the invention claimed is:

1. Apparatus for tilting a mirror assembly of heliostat to track the solar declination, said mirror assembly being tiltedly attached to the heliostat at the declination axis thereof and the mirror assembly being rotated about a polar axis of the heliostat to track azimuthal variations in the sun, comprising:
   (a) axial gear drive means coupled to the assembly and which is rotated therewith, said axial gear drive means having an output shaft;
   (b) pendulum means geared to said axial gear drive means, said pendulum means being held substantially in a plumb position by the force of gravity as said axial gear drive means is rotated in response to the assembly being rotated;
   (c) the output shaft being geared to said axial gear drive means whereby the output shaft is turned by maintenance of said pendulum means substantially plumb as said axial gear drive means is rotated; and
   (d) skew bar linkage means coupling said output shaft to the mirror assembly.

2. The apparatus of claim 1 wherein said skew bar linkage means includes:
   (a) a crank of predetermined length which is attached at one end thereof to the output shaft and rotated therewith;
   (b) a drive pin perpendicularly attached to said crank at the other end thereof at a predetermined radius from the center of said shaft, said drive pin having a distal end spaced from said crank defining a plane of rotation as said drive pin is rotated in response to said crank being rotated; and
   (c) shaft means for linking said distal end of said drive pin with the mirror assembly whereby said mirror being cyclically tilted through a predetermined angle during each complete revolution of said drive pin.

3. The apparatus of claim 2 wherein the ratio of the radius length between said drive pin and the center of said shaft to the distance between said plane of rotation and the heliostat declination axis is equal to 0.208.

4. A heliostat for tracking solar movement including a support member, a rotatable shaft connected to the support member for rotating the heliostat about its polar axis and a mirror assembly including a mirror reflecting surface movably attached to the support member to be tilted about a declination axis of the heliostat, the improvement comprising a parasitic mirror declinator means for tilting the mirror assembly about the declination axis of the heliostat, said parasitic mirror declinator means including an axial gear drive train assembly coupled to and parallel with the rotatable shaft in substantial alignment with the polar axis, a pendulum assembly coupled to said axial gear drive train assembly that is maintained by gravity substantially plumb wherein said axial gear drive train assembly is revolved about said polar axis by said rotatable shaft and driven by said plumb maintenance of said pendulum, an output shaft coupled to said axial gear drive train assembly and a skew bar linkage connecting said output shaft to said mirror assembly which is responsive to rotation of said output shaft by said axial gear drive train to declinate said mirror assembly about the heliostat declination axis.

5. The heliostat of claim 4 wherein said pendulum assembly includes an input shaft coupled to said axial gear drive train assembly to which a rod pendulum is attached at the distal end thereof, said axial gear drive train assembly being driven by gravity maintenance of said pendulum plumb as said axial gear drive train assembly revolves about said polar axis.

6. The heliostat of claim 5 wherein said skew bar linkage includes:
   (a) a crank bar, said crank bar being attached at one end thereof to said output shaft;
   (b) a drive pin connected at the other end of said crank bar opposite said output shaft perpendicularly thereto, the distal end of said drive pin traveling through a plane of rotation as said output shaft is rotated, the length between the center of said output shaft to said drive pin defining a radius in said plane of rotation; and
   (c) drive rod assembly connecting said distal end of said drive pin to said mirror assembly.

7. The heliostat of claim 6 wherein the ratio between the radius in said plane of rotation and the length between the plane of rotation and the declination axis of the heliostat is equal to 0.208.

8. In a heliostat including a mirror forming a declination plane with respect to a support member, the mirror being tiltedly assembled by assembly means to the support member about a declination axis of the heliostat and a shaft member attached to the support member and being rotatable for rotating the heliostat about a polar axis thereof, a mechanism for cyclically tilting the mirror about the declination axis such that the heliostat tracks the solar declination, comprising:
   (a) an axial gear drive means, said axial gear drive being coupled to said shaft member with its drive axis parallel to and in substantial alignment with the heliostat polar axis;
   (b) pendulum means connected with said axial gear drive means, said pendulum means being maintained by gravity in substantially plumb position such that said axial gear drive means is driven as the shaft member is rotated;

(c) an output shaft member coupled with said axial gear drive means which is caused to be turned a predetermined number of revolutions with respect to said axial gear drive means as said axial gear drive means is rotated about said polar axis by said shaft member; and (d) skew bar linkage means coupled between said output shaft member and the mirror assembly means which is responsive to the rotation of said output shaft member for repeatedly nutating the declination plane of the mirror back and forth with respect to the declination axis between two extreme positions.

9. The heliostat of claim 8 wherein said skew bar linkage means includes:
(a) a crank member of predetermined length, said crank member being mounted at one end thereof to said output shaft member;
(b) a drive pin positioned at the other end of said crank member and extending perpendicularly therefrom a predetermined distance, the distal end of said drive pin with respect to said crank member defining a circle in a plane of rotation as said crank member is rotated by said output shaft member being turned; and
(c) linkage means for linking said end of said drive means to said mirror assembly means.

10. The heliostat of claim 9 wherein the the ratio of the radius of said circle to the distance between said plane of rotation and said declination axis has a predetermined constant value.

11. The heliostat of claim 10 wherein said ratio is equal to the constant 0.208.

12. The heliostat of claim 11 wherein the gear drive train ratio of said axial gear drive means is equal to 365:1 such that said crank member is turned one complete revolution as said axial gear drive means is rotated 365 revolutions about said polar axis.

13. A parasitic heliostat mirror declinator for correcting the daily mirror tilt position of the heliostat, the mirror being tiltedly attached about the heliostat declination axis by a mirror assembly, the mirror being cyclically declinated between an upper and lower position to track the solar declination, the heliostat having a polar axis associated therewith and a first rotatable shaft substantially aligned with the polar axis about which the heliostat is rotated, the parasitic mirror declinator comprising:
(a) an axial gear train assembly which is coupled to the first shaft of the heliostat such that said axial gear train is mounted parallel to and substantially in alignment with the polar axis of the heliostat;
(b) pendulum means operatively connected to said axial gear train assembly having substantial weight thereto wherein said pendulum means is maintained substantially plumb by the force of gravity as said shaft of the heliostat is rotated such that said axial gear train assembly is rotated about said polar axis;
(c) an output shaft operatively connected with said axial gear train which is caused to rotate a predetermined portion of a revolution with respect to each rotation of said axial gear train assembly about said polar axis; and
(d) skew bar linkage means connected between said output shaft and the mirror assembly for declinating the mirror as said output shaft is rotated.

14. The parasitic declinator of claim 13 wherein said axial gear drive train assembly is geared with said output shaft with a gear ratio therebetween of 365:1 such that 365 complete revolutions of said gear drive train assembly about said polar axis produces one complete revolution of said output shaft.

15. The parasitic declinator of claim 13 or 14 wherein said skew bar linkage means includes:
(a) a crank member attached to the free end of said output shaft, said crank member having a predetermined length;
(b) a drive pin positioned at one end of said crank member perpendicular thereto, the distal end of said drive pin defining a circle in a plane of rotation as said drive pin is rotated in response to rotation of said crank member; and
(c) linkage means coupling said distal end of said drive pin to the heliostat mirror assembly whereby the mirror is cyclically nutated about the declination axis of the heliostat between an upper and lower position as said output shaft completes one revolution.

16. The parasitic declinator of claim 15 wherein the ratio between the radius of said circle defined by said drive pin to the distance between said plane of rotation and said heliostat declination axis is a fixed constant.

17. The parasitic declinator of claim 16 wherein said ratio between said radius of said circle of rotation of said drive pin to the distance between said plane of rotation and said heliostat declination axis is equal to 0.208.

18. A method for varying the declination of a mirror of a heliostat, the mirror being tiltedly assembled about a declination axis of the heliostat by parasitically driving an output axial shaft of an axial drive gear train mechanism which includes an input axial shaft, comprising the steps of:
providing a first member which is rotatable about its longitudinal axis;
coupling to said first member the axial drive gear train with its input axial shaft parallel to said first member's longitudinal axis;
affixing the free end of the input shaft, which is geared to one end of the output shaft at its other end, to a pendulum of substantial weight, said pendulum being held in a substantially plumb position by the force of gravity;
rotating said axial drive gear train about said first member's longitudinal axis as said first member is rotated thereby causing said output shaft to rotate at a predetermined number of rotations with respect to the rotations of said axial drive gear train about said first member's longitudinal axis as a result of gravity force maintaining said pendulum substantially plumb; and
coupling the free end of the output axial shaft through an axial skew mechanism linkage to the mirror, whereby the mirror angle is repeatedly varied within an arc of approximately 23.5° with respect to the declination axis.

* * * * *